(12) United States Patent
Nochi et al.

(10) Patent No.: US 8,722,559 B2
(45) Date of Patent: May 13, 2014

(54) METHOD OF SUPPRESSING INCREASE IN $SO_2$ OXIDATION RATE OF $NO_x$ REMOVAL CATALYST

(75) Inventors: Katsumi Nochi, Tokyo (JP); Masashi Kiyosawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 101 days.

(21) Appl. No.: 13/555,601

(22) Filed: Jul. 23, 2012

(65) Prior Publication Data

US 2013/0065750 A1   Mar. 14, 2013

Related U.S. Application Data

(60) Provisional application No. 61/532,919, filed on Sep. 9, 2011.

(30) Foreign Application Priority Data

Sep. 9, 2011   (JP) .................................. 2011-197361

(51) Int. Cl.
*B01J 38/02*   (2006.01)

(52) U.S. Cl.
USPC ............................. 502/56; 502/514; 502/517

(58) Field of Classification Search
USPC ............................................ 502/56, 514, 517
See application file for complete search history.

(56) References Cited

U.S. PATENT DOCUMENTS

| 6,232,254 | B1 | 5/2001 | Schneider et al. |
| 6,241,826 | B1 | 6/2001 | Dittmer et al. |

FOREIGN PATENT DOCUMENTS

| JP | 3059136 B2 | 7/2000 |
| JP | 3059137 B2 | 7/2000 |
| JP | 3297305 B2 | 7/2002 |
| JP | 3377715 B2 | 2/2003 |

*Primary Examiner* — Edward Johnson
(74) *Attorney, Agent, or Firm* — Westerman, Hattori, Daniels & Adrian, LLP

(57) ABSTRACT

In a $NO_x$ removal catalyst used for removing nitrogen oxide in flue gas, when a silica (Si) component as an inhibitor that causes an increase in an $SO_2$ oxidation rate accumulates on a surface of the $NO_x$ removal catalyst, the silica component accumulating on the surface of the $NO_x$ removal catalyst is dissolved, thereby regenerating the catalyst. Accordingly, the inhibitor such as the silica component covering the surface of the $NO_x$ removal catalyst can be removed, thereby enabling to provide a catalyst without having an increase in the $SO_2$ oxidation rate of the regenerated $NO_x$ removal catalyst.

11 Claims, 1 Drawing Sheet

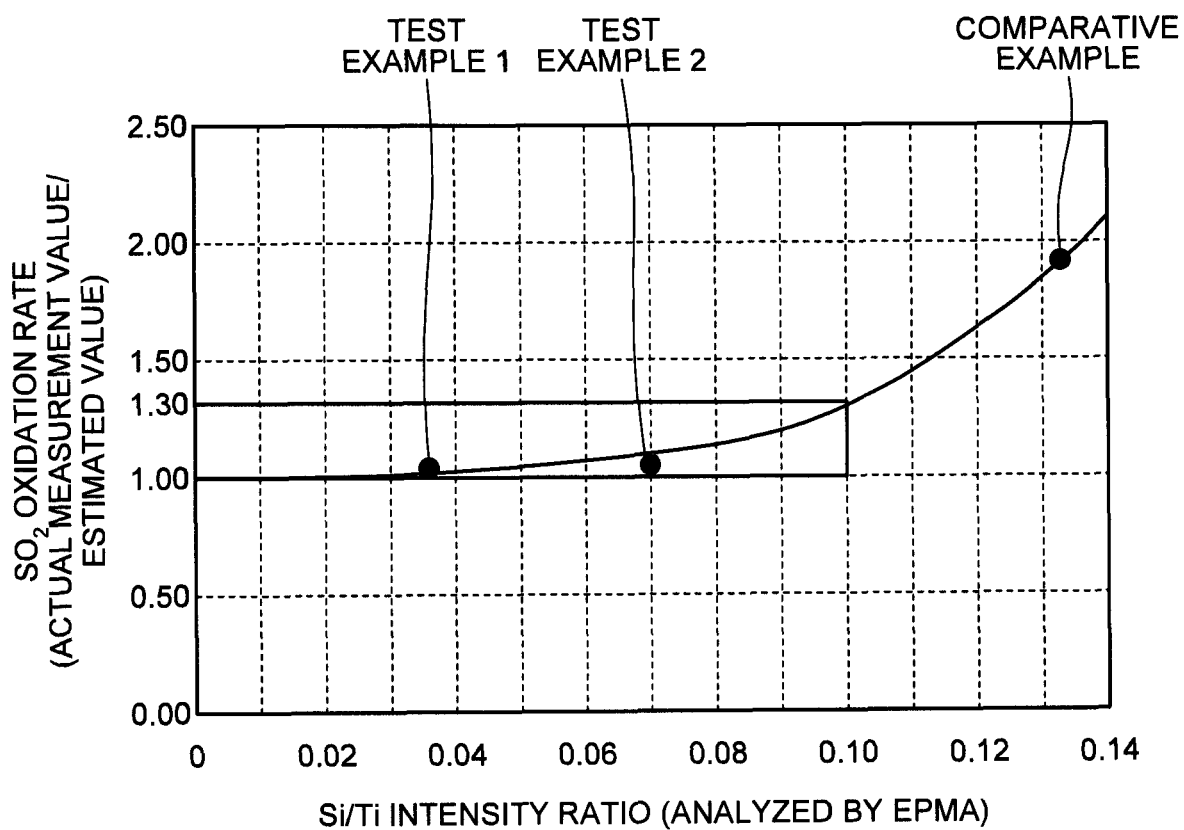

METHOD OF SUPPRESSING INCREASE IN SO₂ OXIDATION RATE OF NOₓ REMOVAL CATALYST

FIELD

The present invention relates to a method of suppressing increase in an $SO_2$ oxidation rate of a $NO_x$ removal catalyst.

BACKGROUND

In recent years, from a viewpoint of preventing air pollution, an ammonia catalytic reduction method in which ammonia is used as a reduction agent to decompose nitrogen oxide (hereinafter, $NO_x$) into nitrogen and water due to contact with a catalyst has been widely used as a method of removing $NO_x$ produced from a boiler or various burners. As the $NO_x$ removal catalyst, which has been currently put into practical use, a honeycomb catalyst having a rectangular hole shape has been the mainstream, in order to prevent blockages due to dust in flue gas and to widen a gas contact area. Furthermore, as a catalyst component, a type of catalyst component containing titanium oxide as a main component is known to be excellent, and another one containing vanadium, tungsten or the like as an active component is generally used. A binary $TiO_2$—$WO_3$ catalyst or a $TiO_2$—$MoO_3$ catalyst, and a ternary $TiO_2$—$V_2O_5$—$WO_3$ catalyst or a $TiO_2$—$V_2O_5$—$MoO_3$ catalyst are mainly used for the catalyst component.

In flue gas discharged from a coal-fired boiler, a calcium content contained in dust in flue gas mainly adheres to a surface of the catalyst to produce anhydrous calcium sulfate contained in flue gas and cover the surface of the catalyst, thereby blocking diffusion of NO and $NH_3$ gas to the inside of the catalyst and deteriorating the performance of the catalyst. Conventionally, at the time of regenerating a catalyst, whose performance is deteriorated due to these causes of deterioration, washing the catalyst with water and an aqueous solution of hydrochloric acid has been known to be effective.

Furthermore, there has been proposed a technique for performing activation treatment of a catalyst with an acidic aqueous solution after reducing a substance accumulated on the catalyst by washing it with an aqueous alkaline solution, at the time of regenerating a $NO_x$ removal catalyst whose $NO_x$ removal performance deteriorates due to accumulation of arsenic ($As_2O_3$) present in flue gas, (Patent Literature 1).

CITATION LIST

Patent Literature

Patent Literature 1: Japanese Patent Application Laid-open No. 2000-037634

SUMMARY

Technical Problem

The present inventors have confirmed that a regeneration effect of an $SO_2$ oxidation rate can be hardly exhibited in a conventional washing process, in the course of performing regeneration tests of a $NO_x$ removal catalyst used for flue gas from a coal-fired boiler. Particularly, for example, when the $NO_x$ removal catalyst regenerated by the method described above is impregnated or coated with an active component of the catalyst containing vanadium or the like, there is a problem that the $SO_2$ oxidation rate is increased.

As a result of examinations on this cause, it has been found that the problem is caused by the presence of silica adhered to the $NO_x$ removal catalyst.

In conventional boiler combustion, its air to fuel ratio is high, and the combustion is performed in a large boiler facility having a sufficient furnace volume, and thus complete combustion of coal as a fuel has been ensured. However, in a recent boiler, because its air ratio is low and combustion is performed in a small boiler facility, combustion is performed under conditions closer to a reduction atmosphere than before, and thus unburned coal is increased, and obstructive factors such as silica present in a form of high-temperature steam in the unburned coal cover the surface of the $NO_x$ removal catalyst and regeneration treatment of the $NO_x$ removal catalyst cannot be performed favorably.

As a result, even when a regenerating process is performed on the $NO_x$ removal catalyst, regeneration is not performed favorably, thereby causing an increase in the $SO_2$ oxidation rate of the $NO_x$ removal catalyst.

The present invention has been achieved to solve the above problems, and an object of the present invention is to provide a method of suppressing an increase in an $SO_2$ oxidation rate of a $NO_x$ removal catalyst, which can remove obstructive factors such as a silicon compound such as silica adhered to the $NO_x$ removal catalyst.

Solution to Problem

According to an aspect of the present invention, a method of suppressing an increase in an $SO_2$ oxidation rate of a $NO_x$ removal catalyst, includes: an alkali treatment step at which an inhibitor, which causes an increase in an $SO_2$ oxidation rate, is removed by washing with an aqueous alkaline solution, at a time of regenerating the $NO_x$ removal catalyst; and an activation treatment step at which activation treatment of the catalyst is performed with an acidic aqueous solution, after the alkali treatment step.

Advantageously, in the method of suppressing an increase in an $SO_2$ oxidation rate of a $NO_x$ removal catalyst, a carrier of the $NO_x$ removal catalyst is titanium oxide, and the inhibitor is a silicon compound, an intensity ratio between titanium and silicon (Si/Ti intensity ratio) on a surface of the $NO_x$ removal catalyst is obtained, and the alkali treatment step and the activation treatment step are performed again when the Si/Ti intensity ratio exceeds a predetermined threshold.

Advantageously, in the method of suppressing an increase in an $SO_2$ oxidation rate of a $NO_x$ removal catalyst, a measurement of the intensity ratio between titanium and silicon is performed by an electron probe microanalyzer (EPMA).

Advantageously, in the method of suppressing an increase in an $SO_2$ oxidation rate of a $NO_x$ removal catalyst, the aqueous alkaline solution is an aqueous solution of NaOH, KOH, $Na_2CO_3$, $NaHCO_3$, or $K_2CO_3$, and the acidic aqueous solution is an aqueous solution of HCl, $HNO_3$, HF, or $H_2SO_4$.

Advantageously, in the method of suppressing an increase in an $SO_2$ oxidation rate of a $NO_x$ removal catalyst, after washing the $NO_x$ removal catalyst, a catalytic component is impregnated and supported in the $NO_x$ removal catalyst.

Advantageously, in the method of suppressing an increase in an $SO_2$ oxidation rate of a $NO_x$ removal catalyst, after washing the $NO_x$ removal catalyst, the $NO_x$ removal catalyst is pulverized and used as a raw material of a $NO_x$ removal catalyst.

Advantageously, in the method of suppressing an increase in an $SO_2$ oxidation rate of a $NO_x$ removal catalyst, after washing the $NO_x$ removal catalyst, a slurry raw material of a $NO_x$ removal catalyst is recoated on a surface of the $NO_x$ removal catalyst.

Advantageous Effects of Invention

According to the present invention, an inhibitor such as a silicon compound or the like that covers the surface of a $NO_x$ removal catalyst can be removed by alkali treatment using an aqueous alkaline solution and activation treatment using an acidic aqueous solution, thereby enabling to provide a catalyst without having an increase in its $SO_2$ oxidation rate of a regenerated $NO_x$ removal catalyst. Furthermore, regeneration of a catalyst and use of the regenerated catalyst contribute to a decrease in industrial waste, which has a large industrial significance in view of environmental issues.

BRIEF DESCRIPTION OF DRAWING

FIG. 1 is a graph in which an Si/Ti intensity ratio is plotted on the horizontal axis, and a ratio between an actual measurement value and an estimated value (actual measurement value/estimated value) of an $SO_2$ oxidation rate is plotted on the vertical axis.

DESCRIPTION OF EMBODIMENTS

The present invention will be explained below in detail with reference to the accompanying drawing. The present invention is not limited the following embodiments, and configurations achieved by combining these embodiments are also included in the present invention. In addition, constituent elements in the following embodiments include those that can be easily anticipated by persons skilled in the art or that are substantially equivalent.

[First Embodiment]

In the present invention, in a $NO_x$ removal catalyst used for removing nitrogen oxide in flue gas, when a silica component (a silicon compound), which is an inhibitor that increases the $SO_2$ oxidation rate, accumulates on the surface of the catalyst, the silica component accumulating on the surface of the catalyst is dissolved to regenerate the catalyst.

The $NO_x$ removal catalyst to be regenerated in the present invention contains titanium oxide as a main component, and contains vanadium, tungsten, or molybdenum as an active component. Specifically, a binary $TiO_2$—$Wo_3$ catalyst or a $TiO_2$—$MoO_3$ catalyst, or a ternary $TiO_2$—$V_2O_5$—$WO_3$ catalyst or a $TiO_2$—$V_2O_5$—$MoO_3$ catalyst can be mentioned.

A sequence of processes of the regeneration method of the present invention includes an activation treatment process after an alkali treatment process, and appropriately includes an impregnation supporting process of a catalytic component as required.

The regeneration method further includes a determining process of determining that an inhibitor that increases the $SO_2$ oxidation rate such as a silica component (a silicon compound) is not present in a predetermined amount or more on the surface of the $NO_x$ removal catalyst.

<Alkali Treatment Process>

First, in the alkali treatment process, a $NO_x$ removal catalyst with the performance thereof deteriorated due to accumulation of a silica component on a surface of a $NO_x$ removal catalyst is washed with an aqueous alkaline solution, thereby reducing silica as an inhibitor from the $NO_x$ removal catalyst.

The washing method is not particularly limited to any particular type, and the objective of washing can be achieved by bringing the $NO_x$ removal catalyst into contact with an alkaline wash solution.

Specifically, the washing method includes a method of immersing the $NO_x$ removal catalyst in an aqueous alkaline solution, a method of placing the $NO_x$ removal catalyst in a static manner in an aqueous solution of sulfuric acid or an aqueous ammonia solution, a method of generating bubbling air or forced convection in a static $NO_x$ removal catalyst to promote renewing of a solution, and the like.

In the alkali treatment process, an aqueous alkaline solution of a strongly basic material is used, and a solution that produces a sodium compound or a potash compound is preferably used as a solution capable of reducing silica.

As an aqueous alkaline solution to be used in the present invention, specifically, an aqueous solution of, for example, $NaOH$, $KOH$, $Na_2CO_3$, $NaHCO_3$, or $K_2CO_3$ can be mentioned.

When the aqueous solution of $NaOH$, $KOH$, $Na_2CO_3$, $NaHCO_3$, or $K_2CO_3$ is used as the aqueous alkaline solution, it is generally effective to set alkali concentration in the aqueous solution to a range from 0.05% to 20% by weight, and set the temperature of the aqueous alkaline solution serving as a wash solution to a range from 10° C. to 90° C.

This is because if the concentration in the aqueous alkaline solution is lower than 0.05% by weight or the temperature of the wash solution is lower than 10° C., washing effect may not be sufficient. In contrast, if the concentration in the aqueous alkaline solution is higher than 20% by weight or the temperature of the wash solution is higher than 90° C., the cost of the treatment facility may increase.

<Activation Treatment Process>

In the activation treatment process, activation treatment is performed on the $NO_x$ removal catalyst cleaned in the alkali treatment process described above by using an acidic aqueous solution.

That is, in the alkali treatment process, silica can be removed by washing from the $NO_x$ removal catalyst. However, because an alkaline component used for reducing silica by washing remains on the catalyst, and the $NO_x$ removal catalyst is poisoned by alkali. Because alkali metal itself is a substance, which may cause deterioration of the $NO_x$ removal catalyst, even if performance deterioration due to accumulation of the silica component (the silicon compound) can be avoided, deterioration due to alkali metal is caused.

Therefore, in the present invention, the activation treatment using the acidic aqueous solution is performed after washing with alkali, thereby removing alkali on the catalyst, and removing all poisonous substances from the $NO_x$ removal catalyst.

Furthermore, in the activation treatment process, it can be considered to use an acidic aqueous solution of organic or inorganic acid as the acidic aqueous solution. However, it is preferable to use the acidic aqueous solution of inorganic acid, when a burden on post-treatment is taken into consideration. Both strong acid and weak acid can be used, so long as the inorganic acid can be ion-exchanged with sodium or potassium.

As the acidic aqueous solution to be used in the present invention, specifically, an aqueous solution of $HCl$, $HNO_3$, $HF$, or $H_2SO_4$ can be mentioned. When the aqueous solution of $HCl$, $HNO_3$, $HF$, or $H_2SO_4$ is used as the acidic aqueous solution, it is generally effective to set the concentration thereof in the aqueous solution to a range from 0.1% to 25% by weight and the temperature of the aqueous solution to a range from 10° C. to 90° C. This is because if the concentration in the acidic aqueous solution is lower than 0.1% by weight or the temperature of the aqueous solution is lower than 10° C., ion exchange may not be sufficient. In contrast, if the concentration in the acidic aqueous solution is higher than 20% by weight or the temperature of the aqueous solution is higher than 90° C., the cost of the treatment facility may increase.

In the present invention, after performing the alkali treatment process and the activation treatment process, the impregnation supporting process for the catalytic component described below can be performed to regenerate the $NO_x$ removal catalyst. When the alkali treatment and the activation treatment by acid are performed, vanadium and tungsten, which are active components of the catalyst, may elute from the $NO_x$ removal catalyst to deteriorate the $NO_x$ removal performance due to a decrease in concentration of the active component of the catalyst. Therefore, in the present invention, after the silica component (the silicon compound) is removed by washing and the catalyst is washed with water and dried, at least one of vanadium and tungsten can be impregnated and supported so that the concentration of the active component in the catalyst becomes the same as that of before regeneration of the catalyst. As a method of supporting vanadium, a method of immersing a catalyst in an aqueous solution in which a vanadium compound such as vanadium pentoxide, ammonium metavanadate, or vanadyl sulfate is dissolved in water, organic acid, and an ammine solution can be mentioned. As a method of supporting tungsten, a method of immersing a catalyst in an aqueous solution in which a tungsten compound such as ammonium paratungstate, ammonium metatungstate, tungsten trioxide, or tungsten chloride is dissolved in water, hydrochloric acid, an ammine solution, and organic acid can be mentioned.

According to the regeneration method of the present invention, a silica component (a silicon compound) accumulating on the catalyst can be washed in an aqueous alkaline solution in the alkali treatment process, thereby reducing the silica component (the silicon compound) accumulating on the surface of the catalyst.

Meanwhile, after the alkali treatment process, Na+ ion may remain on the catalyst. Therefore, in the activation treatment process subsequent to the alkali treatment process, Na+, which may remain on the catalyst and become a poisonous substance to the catalyst, is ion-exchanged by using an acidic aqueous solution such as HCl. Accordingly, Na+ ion is converted to H+ ion, to remove Na+ from the catalyst, thereby enabling to recover the activity of the $NO_x$ removal catalyst.

As described above, washing effect of the silica component (the silicon compound) is increased by the alkali treatment process using an aqueous alkaline solution and the activation treatment process using an acidic aqueous solution. However, elution of vanadium and the like as the active components of the $NO_x$ removal catalyst may be increased, thereby decreasing the concentration of the active components remaining in the catalyst. This means that the $NO_x$ removal performance is not recovered apparently, although the silica component (the silicon compound), which is a substance causing performance deterioration, is removed. Therefore, when elution of the active component in the catalyst is large according to the washing condition, it is effective to recover the catalyst performance by impregnating and supporting vanadium (V) and the like of the catalytic components.

After washing the $NO_x$ removal catalyst, it is effective to pulverize the $NO_x$ removal catalyst and use it as a raw material of a $NO_x$ removal catalyst.

Furthermore, after washing the $NO_x$ removal catalyst, it is also effective to recoat a slurry raw material of a $NO_x$ removal catalyst on the surface of the $NO_x$ removal catalyst.

According to the present invention, at the time of boiler combustion, when an obstructive factor such as gaseous silica (for example, a silicon compound such as organic silica) present in flue gas in a form of high-temperature steam in unburned fuel covers the surface of the $NO_x$ removal catalyst and regeneration of the $NO_x$ removal catalyst is not performed favorably, an inhibitor such as the silica component (the silicon compound), which covers the surface of the $NO_x$ removal catalyst, can be removed by the alkali treatment using an aqueous alkaline solution and the activation treatment using an acidic aqueous solution, thereby enabling to provide a catalyst with no increase in the $SO_2$ oxidation rate of the regenerated $NO_x$ removal catalyst. In addition, regeneration and reuse of the catalyst contribute to a decrease in industrial waste, which has a significant industrial meaning in view of environmental issues.

<Determining Process>

The determining process is a process of determining that the silica component is not present in a predetermined amount or more on the surface of the regenerated $NO_x$ removal catalyst.

The determining process is a process of measuring an intensity ratio of titanium and silica on the surface of the $NO_x$ removal catalyst. It is preferable to perform the measurement by an electron probe microanalyzer (EPMA).

The intensity ratio can be also measured by X-ray fluorescence analysis (XRF) other than the EPMA.

At the time of measuring titanium and silica (silicon) on the surface of the regenerated $NO_x$ removal catalyst, when glass fibers constituting the catalyst are present, it is preferable to irradiate electron beams to a position where there is no glass fiber to detect generated characteristic X-ray.

Accordingly, the Si/Ti intensity ratio can be determined without being affected by the glass fiber.

At the time of performing the measurement by the EPMA, it is preferable to measure a plurality of positions on the surface of the regenerated $NO_x$ removal catalyst to obtain a mean value thereof, thereby obtaining the intensity ratio.

The Si/Ti intensity ratio is preferably set to, for example, equal to or lower than 0.1, and more preferably equal to or lower than 0.08.

It is preferable that the ratio is within this range, because a ratio between an actual measurement value and an estimated value (actual measurement value/estimated value) of the $SO_2$ oxidation rate of the $NO_x$ removal catalyst is in a range from 1.00 to 1.30.

This is because when the actual measurement value/estimated value exceeds 1.30, the $SO_2$ oxidation rate is significantly increased, regeneration of the $NO_x$ removal catalyst becomes insufficient, and the $NO_x$ removal catalyst cannot be reused.

Therefore, when the Si/Ti intensity ratio exceeds a predetermined threshold (for example, 0.1), the alkali treatment process and the activation treatment process are performed again to remove silica (silicon), which is an inhibitor that causes an increase in the $SO_2$ oxidation rate, and determination is performed again by the determining process to confirm whether the $NO_x$ removal catalyst is reusable.

Accordingly, the catalytic component such as vanadium (V) is reliably supported on the surface of titanium (Ti) serving as a carrier and the catalytic activity becomes favorable.

That is, when the Si/Ti intensity ratio exceeds a predetermined threshold (for example, 0.1), the surface of titanium (Ti) serving as a carrier is covered with the silica component (the silicon compound). In this case, even when vanadium (V) as an active component is supported, the rate of supporting vanadium directly on the surface of titanium (Ti) is decreased. As a result, the catalytic activity of vanadium is not sufficient, thereby causing an increase in the $SO_2$ oxidation rate.

For example, in the alkali treatment process, regeneration may become insufficient (Si/Ti is equal to or higher than 0.10) by alkali washing using 1N—NaOH at 40° C. In this case, it suffices that the washing is performed while raising the alkali washing condition by 1N—NaOH to 60° C.

As described above, by performing the alkali treatment using an aqueous alkaline solution and the activation treatment using an acidic aqueous solution, and confirming that the Si/Ti intensity ratio does not exceed a predetermined threshold (for example, 0.1), a regenerated $NO_x$ removal catalyst having no increase in the $SO_2$ oxidation rate can be provided with a decreased residual ratio of the inhibitor, which causes an increase in the $SO_2$ oxidation rate, such as the silica component (the silicon compound) that covers the surface of the $NO_x$ removal catalyst.

TEST EXAMPLES

The present invention is explained below in more detail by test examples; however, the present invention is not limited to these examples.

As a used $NO_x$ removal catalyst, a used $NO_x$ removal catalyst in which silica (a silicon compound) was deposited on a surface thereof (a honeycomb catalyst with 6 holes×7 holes× 900 millimeters) was prepared.

Alkali washing and activation treatment were performed by using the used $NO_x$ removal catalyst to perform regeneration treatment.

An Si/Ti intensity ratio on the surface of the regenerated $NO_x$ removal catalyst after the treatment was analyzed by an EPMA.

In analysis by the EPMA, electron beams were irradiated, while avoiding glass fibers present on the surface by using an electronic microscope (SEM).

For the analysis by the EPMA, an X-ray microanalyzer ("XA-8900RL (trade name)" manufactured by JEOL Ltd.) was used.

Test examples 1 and 2 were $NO_x$ removal catalysts, for which alkali washing was sufficiently performed, and a comparative example was a $NO_x$ removal catalyst, for which alkali washing was not sufficient.

An increase in the $SO_2$ oxidation rate was determined by measuring $SO_3$ at an inlet and an outlet of a regenerated $NO_x$ removal catalyst to confirm the increase, and a ratio between an actual measurement value and an estimated value (actual measurement value/estimated value) of the $SO_2$ oxidation rate was obtained from the actual measurement value and the estimated value.

The catalyst used in the test example 1 contained 91.4% by weight of $TiO_2$, 8.0% by weight of $WO_3$, and 0.63% by weight of $V_2O_5$.

The catalyst used in the test example 2 contained 91.4% by weight of $TiO_2$, 8.0% by weight of $WO_3$, and 0.59% by weight of $V_2O_5$.

The catalyst used in the comparative example contained 91.2% by weight of $TiO_2$, 8.0% by weight of $WO_3$, and 0.83% by weight of $V_2O_5$.

FIG. 1 is a graph in which an Si/Ti intensity ratio is plotted on the horizontal axis, and a ratio between an actual measurement value and an estimated value (actual measurement value/estimated value) of an $SO_2$ oxidation rate is plotted on the vertical axis.

Ratios between the actual measurement value and the estimated value (actual measurement value/estimated value) of the $SO_2$ oxidation rate in the test examples 1 and 2 and the comparative example are shown in Table 1.

TABLE 1

|  | Test example 1 | Test example 2 | Comparative example |
|---|---|---|---|
| Actual measurement value of $SO_2$ oxidation rate | 0.59% | 0.55% | 0.79% |
| Estimated value of $SO_2$ oxidation rate | 0.61% | 0.58% | 1.53% |
| Actual measurement value/estimated value | 1.03 | 1.05 | 1.94 |

As shown in FIG. 1 and Table 1, the catalyst in the test example 1 had the Si/Ti intensity ratio of 0.036, and the catalyst in the test example 2 had the Si/Ti intensity ratio of 0.072, in which each ratio between the actual measurement value and the estimated value of the $SO_2$ oxidation rate was 1.03 and 1.05, respectively, which was lower than 1.3 and close to 1.0, and there was only a slight increase in the $SO_2$ oxidation rate as compared to that of a fresh catalyst.

On the other hand, the Si/Ti intensity ratio of the catalyst in the comparative example was 0.132, which largely exceeded 0.1. The ratio between the actual measurement value and the estimated value (actual measurement value/estimated value) of the $SO_2$ oxidation rate was 1.94, which exceeded 1.3, and there was a large increase in the $SO_2$ oxidation rate as compared to that of a fresh catalyst.

As a result, it was confirmed that, by setting the Si/Ti intensity ratio equal to or lower than 0.1, the increase in the $SO_2$ oxidation rate of the regenerated catalyst does not become larger as compared to that of a fresh catalyst.

The invention claimed is:

1. A method of suppressing an increase in an $SO_2$ oxidation rate of a $NO_x$ removal catalyst, comprising:
   an alkali treatment step at which an inhibitor, which causes an increase in an $SO_2$ oxidation rate, is removed by washing with an aqueous alkaline solution, at a time of regenerating the $NO_x$ removal catalyst; and
   an activation treatment step at which activation treatment of the catalyst is performed with an acidic aqueous solution, after the alkali treatment step.

2. The method of suppressing an increase in an $SO_2$ oxidation rate of a $NO_x$ removal catalyst according to claim 1, wherein
   a carrier of the $NO_x$ removal catalyst is titanium oxide, and the inhibitor is a silicon compound,
   an intensity ratio between titanium and silicon (Si/Ti intensity ratio) on a surface of the $NO_x$ removal catalyst is obtained, and
   when the Si/Ti intensity ratio exceeds a predetermined threshold,
   the alkali treatment step and the activation treatment step are performed again.

3. The method of suppressing an increase in an $SO_2$ oxidation rate of a $NO_x$ removal catalyst according to claim 2, wherein a measurement of the intensity ratio between titanium and silicon is performed by an electron probe microanalyzer (EPMA).

4. The method of suppressing an increase in an $SO_2$ oxidation rate of a $NO_x$ removal catalyst according to claim 1, wherein the aqueous alkaline solution is an aqueous solution of NaOH, KOH, $Na_2CO_3$, $NaHCO_3$, or $K_2CO_3$, and the acidic aqueous solution is an aqueous solution of HCl, $HNO_3$, HF, or $H_2SO_4$.

5. The method of suppressing an increase in an $SO_2$ oxidation rate of a $NO_x$ removal catalyst according to claim 1, wherein after washing the $NO_x$ removal catalyst, a catalytic component is impregnated and supported in the $NO_x$ removal catalyst.

6. The method of suppressing an increase in an $SO_2$ oxidation rate of a $NO_x$ removal catalyst according to claim 1, wherein after washing the $NO_x$ removal catalyst, the $NO_x$ removal catalyst is pulverized and used as a raw material of a $NO_x$ removal catalyst.

7. The method of suppressing an increase in an $SO_2$ oxidation rate of a $NO_x$ removal catalyst according to claim 1, wherein after washing the $NO_x$ removal catalyst, a slurry raw material of a $NO_x$ removal catalyst is recoated on a surface of the $NO_x$ removal catalyst.

8. The method of suppressing an increase in an $SO_2$ oxidation rate of a $NO_x$ removal catalyst according to claim 2, wherein the aqueous alkaline solution is an aqueous solution of $NaOH$, $KOH$, $Na_2CO_3$, $NaHCO_3$, or $K_2CO_3$, and the acidic aqueous solution is an aqueous solution of $HCl$, $HNO_3$, $HF$, or $H_2SO_4$.

9. The method of suppressing an increase in an $SO_2$ oxidation rate of a $NO_x$ removal catalyst according to claim 2, wherein after washing the $NO_x$ removal catalyst, a catalytic component is impregnated and supported in the $NO_x$ removal catalyst.

10. The method of suppressing an increase in an $SO_2$ oxidation rate of a $NO_x$ removal catalyst according to claim 2, wherein after washing the $NO_x$ removal catalyst, the $NO_x$ removal catalyst is pulverized and used as a raw material of a $NO_x$ removal catalyst.

11. The method of suppressing an increase in an $SO_2$ oxidation rate of a $NO_x$ removal catalyst according to claim 2, wherein after washing the $NO_x$ removal catalyst, a slurry raw material of a $NO_x$ removal catalyst is recoated on a surface of the $NO_x$ removal catalyst.

* * * * *